Jan. 11, 1938.   M. A. WHITING   2,105,384
CONTROL SYSTEM
Filed Dec. 1, 1936

Inventor:
Max A. Whiting,
by Harry E. Dunham
His Attorney.

Patented Jan. 11, 1938

2,105,384

UNITED STATES PATENT OFFICE 2,105,384

CONTROL SYSTEM

Max A. Whiting, Schenectady, N. Y., assignor to General Electric Company, a corporation of New York Application December 1, 1936, Serial No. 113,654

10 Claims. (Cl. 172—239)

This invention relates to control systems, more particularly to systems for controlling the load current of a generator, and it has for an object the provision of a simple, reliable and improved system of this character.

More specifically, the invention relates to constant current regulating systems for generators, and a more specific object of the invention is the provision of a system that is an improvement over the conventional three-field drooping characteristic generator.

Another object is the provision of a constant current regulating system for generators in which it is possible to use a smaller, more easily operated and less expensive controller and variable resistance than those required for direct control of the three-field generator.

Still another object is to simplify and lower the cost of the generator field by reducing the number of field windings on the generator, while preserving the desired substantially constant current characteristic.

In carrying the invention into effect in one form thereof, the generator is provided with a main field winding and with an auxiliary field winding, and an exciter is provided for exciting the main field winding. The exciter is provided with a main field winding separately excited from a constant voltage bus and also with an auxiliary field winding. One of these auxiliary field windings is excited by the voltage of the generator and the other is a differential field winding excited by the load current of the generator. The differential current winding is on the exciter and the voltage winding is on the generator in one modification of the invention, and in another modification this arrangement is reversed.

A variable resistance is included in the separately excited field circuit and a master switch is provided for varying this resistance.

In illustrating the invention in one form thereof, it is shown as embodied in a system for controlling the load current of a variable voltage generator supplying the hoist motion motor of an electric shovel. The invention, however, has other applications.

Figure 1:
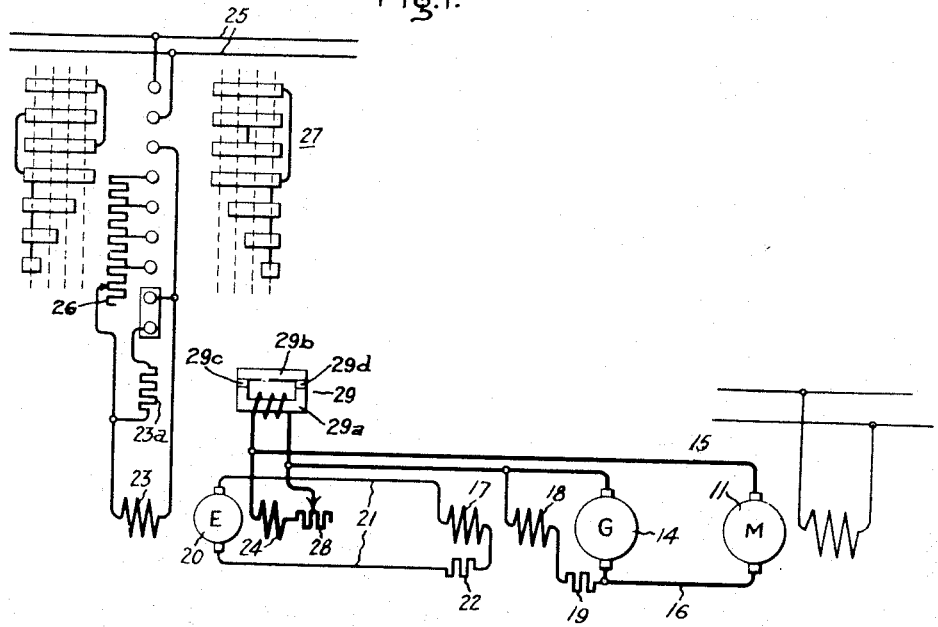
Figure 2:
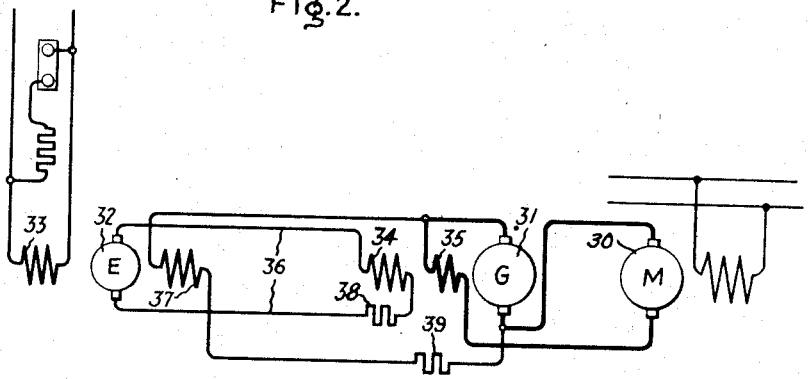
Figure 3:
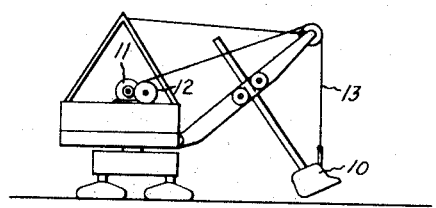

For a better and more complete understanding of the invention, reference should now be had to the following specification and to the accompanying drawing in which Figs. 1 and 2 are simple diagrammatical illustrations of embodiments of the invention and Fig. 3 is a very simplified diagrammatical illustration of an electric shovel illustrating an application of the invention.

Referring now to Figs. 1 and 3 of the drawing, the hoist motion of the dipper 10 of an electric shovel is effected by means of a motor 11 that is connected to drive a drum upon which the hoist cable 13 is wound. The motor 11 is illustrated as a typically shunt wound, separately excited direct-current motor. It is supplied from a generator 14 to the armature terminals of which the motor armature is connected in a loop circuit by means of conductors 15 and 16.

Generator 14 is driven by suitable driving means (not shown) at a speed which is preferably substantially constant. As shown, generator 14 is provided with two field windings 17 and 18. The field winding 18 is a self-excited winding connected in shunt with the armature of the generator so as to be excited in accordance with the generator voltage. A permanent resistance 19 may be connected in circuit with the shunt field winding. This permanent resistance typically is preferably of somewhat greater resistance than the ohmic resistance of the field winding 18. The purpose of this resistance is to decrease its time constant and to increase the speed of response of the generator flux.

The generator field winding 17 is separately excited by means of an exciter 20 to which the field winding 17 is connected by means of conductors 21. A permanent resistor 22 may be connected in circuit with field winding 17 and typically this resistor has a larger ohmic resistance than that of the field winding 17, and its purpose is generally similar to the purpose of the resistance 19.

Exciter 20 is provided with a separately excited field winding 23 and with an auxiliary field winding 24. The separately excited field winding 23 is supplied from a constant voltage bus represented by the two supply lines 25. A variable resistance 26 is included in the circuit of the separately excited field winding 23 and a reversing type master switch 27 of conventional construction is provided for varying the effective amount of the resistance 26 and also for controlling the direction of current flow in the winding 23, thereby ultimately to control the speed and direction of rotation of the motor 11.

In some specific embodiments of the conventional three-field generator suitable characteristics at reduced voltages are obtained by confining the variation of resistance to the separately excited field circuit, but leaving the self-excited field circuit resistance unaffected by the controller movement. In other specific embodiments the preferred characteristics are obtained by arranging the controller to vary additionally the resistance in series with the self-excited field.

Correspondingly in Fig. 1 of my present invention, in some embodiments only the resistor 26 may be arranged to be varied by the controller but in others it may be preferable to add, in series with resistor 19 between field 18 and the generator armature 14 a variable resistor which is controlled by the controller. The manner of making such addition will be evident to those skilled in the art and for simplicity of the drawing this addition is not shown.

It will usually be preferable to design field winding 23 so as to require for its normal maximum excitation much less than the total voltage of the supply lines 25, the remainder of this total being absorbed by a permanent resistor, shown in Fig. 1 as part of resistor 26. Typically the resistance of field winding 23 may be no more than about one-fifth that of the permanent resistor in series with it. Thus the time constant of exciter 20 is caused to be very small compared with that of generator 14. Thereby it is provided that the responses of the field of generator 14 to the movement of controller 27 or to load current changes in winding 24 are not substantially delayed by the indirectness of the method of generator excitation.

A discharge resistance 23a is provided for the separately excited field winding 23, and the master switch is provided with contacts which connect this discharge resistance across the field winding 23 when the master switch is in its off position as illustrated.

The auxiliary field winding 24 is differential to the field winding 23 and is connected in series relationship in the loop circuit between the armatures of the generator 14 and the motor 11, so as to be excited by the load current supplied by the generator 14. An adjustable resistor 28 is included in the circuit in series relationship with the field winding 24, and an inductive shunt 29 is connected in parallel with field winding 24 and resistor 28. The function of these elements is explained hereinafter.

With the foregoing understanding of the apparatus and its organization in the system, the operation of the system itself will readily be understood from the following description: The hoist motor 11 is started from rest and accelerated by operating the master switch to the left from the central off position in which it is shown to the fourth hoisting position. The circuit of the discharge resistance 23a is first opened and as the master switch passes through its successive positions, the field winding 23 is connected to the constant voltage bus 25 and the resistance 26 is short-circuited in steps thereby to increase the excitation of the exciter 20. As a result, the excitation of the generator 14 is increased and likewise the motor 11 is started from rest and accelerated to a running speed.

The arrangement of the field windings on the generator 14 and on the exciter 20 produces a drooping voltage current characteristic in the generator 14 in which the current of the generator is maintained substantially constant over a wide range of voltages. In this arrangement, the differential action of the field winding 24 on the exciter as the generator load current increases, will reduce the exciter voltage at any given position of the master switch. As a result the excitation of the generator field 17 will be correspondingly reduced. The reduction of voltage caused by the decrease of excitation of the field 17 of the generator will cause a decrease of excitation of the shunt field winding 18. The result of this is to decrease the generator voltage still further in response to an increase of load. Thus the load current of the generator remains fairly constant over a wide range of voltages. That is to say, for relatively large changes in voltage, the corresponding changes in load current of the generator are relatively small.

Under conditions which do not change too rapidly, the generator characteristic protects the generator itself, the motor and the hoist mechanism and structure against abnormal overload. In the hoist motion of a shovel, the motor may be stalled rather suddenly from a substantial speed while the master switch remains at full speed position. Under this circumstance, the generator flux needs to decline rapidly. Where the differential series function consists of turns of generator load current about the exciter poles, as in the modification of Fig. 1, the indirectness with which this function is applied tends to cause the generator flux response to be somewhat sluggish when the motor is thus suddenly stalled. For example, consider the dipper digging through the bank at a fairly high speed and the dipper suddenly fetching up against a large boulder or a comparatively unbroken rock stratum. As there is relatively little yield in the mechanism or in the roping system, the hoist stalls almost instantly. Under this condition, the generator voltage should decline rapidly and the generator current should not seriously exceed the steady state value over this range of voltages. The inductance of the generator field, however, is considerable. The two shunt windings 17 and 18 act as damping circuits and may prevent the decay of the generator flux from being as rapid as desirable in response to the increase of differential series excitation in winding 24 on the exciter. Consequently, when the dipper is snagged in this manner, the current may rise momentarily to an abnormal value.

A very moderate transient excess of generator current over the steady-state value tends to benefit the digging ability of the dipper, particularly in rocky digging, and in some installations may be quite without detrimental effect. In other installations, however, transient overloads such as these may be more severe and may be objectionable. They may contribute to commutation troubles. They cause severe shocks to shovel machinery and structure and tend to increase the maintenance and shorten the life of the shovel. Slip couplings have been used, intended to hold at all torques below that of the steady-state stalled current and to slip at all higher torques. Slip couplings that have thus far been applied do not provide a complete cure of the difficulty.

In order to prevent the generator load current from rising to an abnormal value under such conditions of overload, a highly inductive shunt 29 is provided and is connected in parallel with the differential series winding 24.

The winding of this inductive shunt is of substantially lower resistance than the resistance of the differential series field winding 24, and its time constant L/R is substantially greater. To give an illustration by way of example, the shunt may be so proportioned that 90% of the steady state load current traverses the winding of the inductive shunt and only 10% of the steady state current flows in the differential series field winding itself. It is to be understood, however, that this is only an example and that a wide range of proportions is available to the worker skilled in the art. The differential series field winding will have proportionally more turns so as to provide the requisite ampere turns. With such an arrangement, when the load current begins to rise abruptly, nearly all the increment of current is momentarily choked out of the inductive shunt and must traverse the differential series field winding. Hence, a disproportionately high transient demagnetizing effect is imposed by the differential series field winding, which tends to reduce the generator flux very rapidly and thus to prevent a severe transient overload.

As will be understood by those experienced in the design of inductive shunts for use in direct-current circuits, inductive shunt 29 should preferably include in its magnetic path one or more air-gaps, so as to minimize the effect of saturation and obtain an inductance which is reasonably uniform for all current increments up to the maximum. As shown, the inductive shunt has a magnetic circuit composed of two members 29a and 29b separated at two faces by non-magnetic shims 29c and 29d. If the inductance provided in element 29 is found, in a specific installation, to be greater than desired, it may readily be decreased by substituting thicker non-magnetic shims so as to increase the air gaps. If the members of the magnetic circuit were entirely unlaminated, for example, if they were fabricated from bar stock, a substantial part of the inductive effect in the winding of 29 might be lost by reason of substantial eddy currents induced in these unlaminated magnetic members. These magnetic members of 29 should therefore preferably be of laminated construction.

It may be convenient to design field winding 24 to have its normal degree of effectiveness when, for example, approximately one-half of resistor 28 is in circuit. Thus if it becomes desirable to increase or decrease the effect obtained from field winding 24, this may be done by connecting less or more of resistor 28 in circuit.

If this invention is applied to the crowd motion of a shovel, the inductive shunting of field 24 by inductive shunt 29 may or may not be preferable, according to the particular conditions. In some other applications, for example, in the swing motion of a shovel the sudden stalling, or "snagging" of the motion does not occur, hence the inductive shunting will not be preferred.

The system of Fig. 2 is substantially identical with the system of Fig. 1 except that the field windings on the generator and the exciter are differently arranged.

In the modification of Fig. 2, the motor 30, generator 31, and the exciter 32 correspond to the motor 11, generator 14 and exciter 20 of Fig. 1. Exciter 32 is provided with a separately excited field winding 33. This field winding is supplied from a separate source of excitation through a variable resistance controlled by a reversing type master switch. Since the variable resistance, master switch and separate source of excitation are identical with those disclosed in Fig. 1, they are omitted from Fig. 2 for the purpose of simplification.

The generator 31 is provided with a main field winding 34 and with a series differential field winding 35 which carries the main load current of the generator.

Field winding 34 is supplied from the exciter 32 to which it is connected by means of conductors 36. As shown, exciter 32 is provided with a field winding 37 which is connected across the terminals of the generator so as to be excited by the generator voltage. Permanent resistances 38 and 39 are included in the circuits of field windings 34 and 37 respectively.

It has been pointed out that in the conventional three-field generator reduced voltages are sometimes obtained by confining the variation of resistance to the separately excited field circuit, but in other specific embodiments the preferred characteristics are obtained by arranging the controller to vary additionally the resistance in series with the self-excited field.

Correspondingly in Fig. 2 of the present invention, in some embodiments only the resistor 26 may be arranged to be varied by the controller but in others it may be preferable to add, in series with resistor 39 between field 37 and the generator armature 31 a variable resistor which is controlled by the controller. The manner of making such addition will be evident to those skilled in the art and for simplicity of the drawing this addition is not shown.

In this modification, the function of the field winding 37 is similar to that of the self-excited field winding 18 of Fig. 1.

In operation, an increase of load current of the generator 31 produces an increase in the excitation of the series differential field winding 35. This acts directly upon the generator 31 and causes its voltage to decrease. In turn, this decreases the excitation of the exciter 32 which thereupon decreases the excitation of the field winding 34. In this arrangement, that part of the droop in the volt ampere characteristic which occurs as the direct consequence of the action of the series differential field winding 35 takes place without additional delay, and for this reason an inductive shunt such as the shunt 29 used in the modification of Fig. 1 is not required. The remainder of the operation of the system of Fig. 2 is identical with the operation of Fig. 1 as explained in the foregoing, and a repetition is unnecessary.

Although in accordance with the provisions of the patent statutes, this invention is described as embodied in concrete form, it will be understood that the apparatus and connections shown are merely illustrative and that the invention is not limited thereto, since modifications and alterations will readily suggest themselves to persons skilled in the art without departing from the true spirit of the invention or from the scope of the annexed claims.

What I claim as new and desire to secure by Letters Patent of the United States, is:

1. A control system comprising in combination, a generator having main and auxiliary field windings, an exciter for exciting said main winding, said exciter being provided with a separately excited main field winding and with an auxiliary field winding, one of said auxiliary windings being cumulative with its associated main winding and excited in accordance with the voltage of said generator, and the other of said auxiliary windings being differential with its associated main winding and excited in accordance with the load current of said generator.

2. A control system comprising in combination, an electric motor, a supply generator for said motor having a main field winding and an auxiliary field winding, an exciter connected to said main field winding and having a separately excited field winding and an auxiliary field winding, one of said auxiliary windings being a cumulative winding energized by the voltage of said generator and the other of said auxiliary windings being a differential winding energized by the current supplied by said generator to said motor.

3. A control system comprising in combination, an electric motor, a supply generator for said motor, said generator having a main field winding and an auxiliary field winding, an exciter connected to said main field winding, said exciter having a separately excited main field winding and an auxiliary field winding, one of said auxiliary field windings being cumulative with its associated main field winding and energized by the voltage of said generator and the other of said auxiliary field windings being differential with its associated main field winding and energized by the current supplied from said generator to said motor, a variable resistance in said separately excited field circuit, and a multi-position reversing type master switch for controlling said variable resistance.

4. A control system comprising a generator provided with a main field winding and with a shunt field winding, an exciter for exciting said main field winding, said exciter being provided with a separately excited field winding and with a differential field winding energized by the current of said generator.

5. The combination with an electrical load characterized by a variable counter-voltage, of a generator for supplying said load, said generator being provided with a main field winding and a cumulative shunt winding, an exciter for exciting said main field winding, said exciter having a separately excited field winding and a differential field winding excited by the load current of said generator so that under relatively steady state conditions said load current is maintained substantially constant over a wide range of voltage and means comprising an inductive winding connected in parallel with said differential field winding whereby when said counter-voltage decreases abruptly the transient value of said load current is prevented from increasing substantially above said substantially constant value.

6. A control system comprising in combination an electric motor, a generator for supplying said motor, said generator being provided with a main field winding and with cumulative shunt field winding, an exciter for exciting said main field winding, said exciter being provided with a separately excited field winding and with a differential field winding excited by the current supplied by said generator to said motor, whereby under steady state conditions said generator current is maintained substantially constant over a wide range of voltages, and means for maintaining said generator current substantially constant during rapid changes of load on said motor comprising a magnetic shunt connected in parallel with said differential winding and having an ohmic value that is small in comparison with the ohmic value of said differential winding.

7. A control system comprising in combination, a generator provided with a main field winding and a shunt field winding, a motor supplied from said generator, an exciter for exciting said main field winding, said exciter being provided with a separately excited field winding and with a differential field winding excited by current supplied from said generator to said motor whereby under steady state conditions said current is maintained substantially constant over a wide range of voltages, means for maintaining said generator load current substantially constant during sudden changes of load on said motor comprising a magnetic shunt connected in parallel with said differential winding and having a time constant that is large with respect to the time constant of said differential field, a variable resistance in said separately excited field circuit, and a multi-position reversing type master switch for controlling said resistances.

8. A constant current regulating system comprising in combination, a generator provided with a main field winding and with a series differential winding, and an exciter for said main winding having a separately excited main winding and a cumulative auxiliary winding energized by the voltage of said generator.

9. A control system comprising in combination, an electric motor, means for supplying a substantially constant current to said motor over a wide range of voltages comprising a generator provided with a main field winding and with a series differential field winding and an exciter for said main winding, said exciter having a separately excited winding and a cumulative winding energized by the voltage of said generator, a variable resistance in said separately excited field circuit, and a reversing type master switch for controlling said resistance and the direction of current flow in said separately excited field circuit.

10. A control system comprising in combination, an electric motor, means for supplying substantially constant current to said motor over a wide range of voltages comprising a generator provided with main and series differential field windings and an exciter for said main winding provided with a separately excited field winding and with a cumulative auxiliary field winding excited by the voltage of said generator, a permanent resistor in the circuit of said auxiliary winding and a permanent resistor in the circuit of said main field winding for decreasing the time constants of said field windings, a variable resistance in said separately excited field circuit, and a reversing type master switch for controlling said resistances and the direction of current in said separately excited winding thereby to control the speed and direction of rotation of said motor.

MAX A. WHITING.